Feb. 25, 1941.  R. W. LUCE  2,233,057

MOLDING APPARATUS

Filed Nov. 9, 1937   3 Sheets-Sheet 2

INVENTOR
RICHARD W. LUCE.
BY
ATTORNEY

Feb. 25, 1941.     R. W. LUCE     2,233,057
MOLDING APPARATUS
Filed Nov. 9, 1937     3 Sheets-Sheet 3

INVENTOR
RICHARD W. LUCE
BY
ATTORNEY

Patented Feb. 25, 1941

2,233,057

UNITED STATES PATENT OFFICE 2,233,057

MOLDING APPARATUS

Richard W. Luce, Westfield, N. J., assignor to Signal Service Corporation, a corporation of Delaware Application November 9, 1937, Serial No. 173,577

2 Claims. (Cl. 49—72)

The invention herein disclosed relates to the molding of thermoplastic materials such as glass and the like and it is particularly useful in molding lenses for optical purposes. While the invention is hereinafter described in conjunction with the molding of glass, it nevertheless comprehends the molding of other thermoplastic materials which have many of the characteristics of glass from the standpoint of molding and particularly those thermoplastics that are suitable for lenses.

In the ordinary process of manufacturing articles of glass for optical purposes, the glass is gradually heated in a suitable kiln until it is soft enough to adapt itself to the contours of a mold. The glass is then worked into the mold by pressure and so shaped into plates, blocks or discs suitable for subsequent grinding into the exact shape and curvature that may be required. In some cases, particularly where the glass is required in the form of small thin discs or in the approximate shape of concave or convex lenses, a press is used to force the pliable glass into the recesses of the mold. The blanks so formed are subsequently cut and ground into the desired article and then polished. The cutting, grinding and polishing of curved surfaces on glass is very expensive, and for certain types of lenses, particularly those used as an element in autocollimators or reflecting buttons which are used in roadside warning signs, there has been developed a method for molding the lenses from cane glass. This process, however, necessitates the production of cane glass from the pot glass and then molding the lenses individually from the cane glass, and it is an object of this invention to mold glass, for example, into such lenses, directly from pot glass.

In the molding of glass, and particularly lenses, there is a difficulty arising from the contact of the glass with the mold and the shrinking of the glass. That portion of the glass which contacts directly with the surface of the mold cools more rapidly than the body of the glass, and upon the subsequent cooling and shrinking of the body of the glass, the surface becomes distorted. Consequently, as articles have heretofore been molded from glass, it is not possible, without subsequent grinding and finishing, to secure surfaces sufficiently accurate for optical purposes.

In accordance with this invention, pot glass in a heated, pliable state, is introduced into the mold of a press and pressure is exerted upon the glass to cause it to fill and take the shape of the recess of the mold. The recess is expansible and upon coming in contact with the glass it is at its minimum volume so that the molten glass immediately takes the shape of the curvature of the recess, and as the glass continues to enter the recess, the recess expands to its ultimate size. The expansion of the recess under the pressure of the pliable glass is resisted by a reactive force so that the glass in the recess is maintained under pressure of sufficient amount to maintain the glass in pressure contact with the surface of the recess at all times and during the shrinking of the glass. The glass is thus caused to take the shape of the recess of the mold without any distortion of its surface and a surface is produced which is suitable for optical purposes without subsequent grinding.

An advantage of this method of molding glass is the fact that a plurality of lenses, for example, may be molded in a gang.

The molding of glass in accordance with this invention is described in detail below in connection with the description of a mold that is illustrated in the accompanying drawings, that forms a part of this invention, and that is suitable for molding lenses in accordance with this invention.

Figure 1:
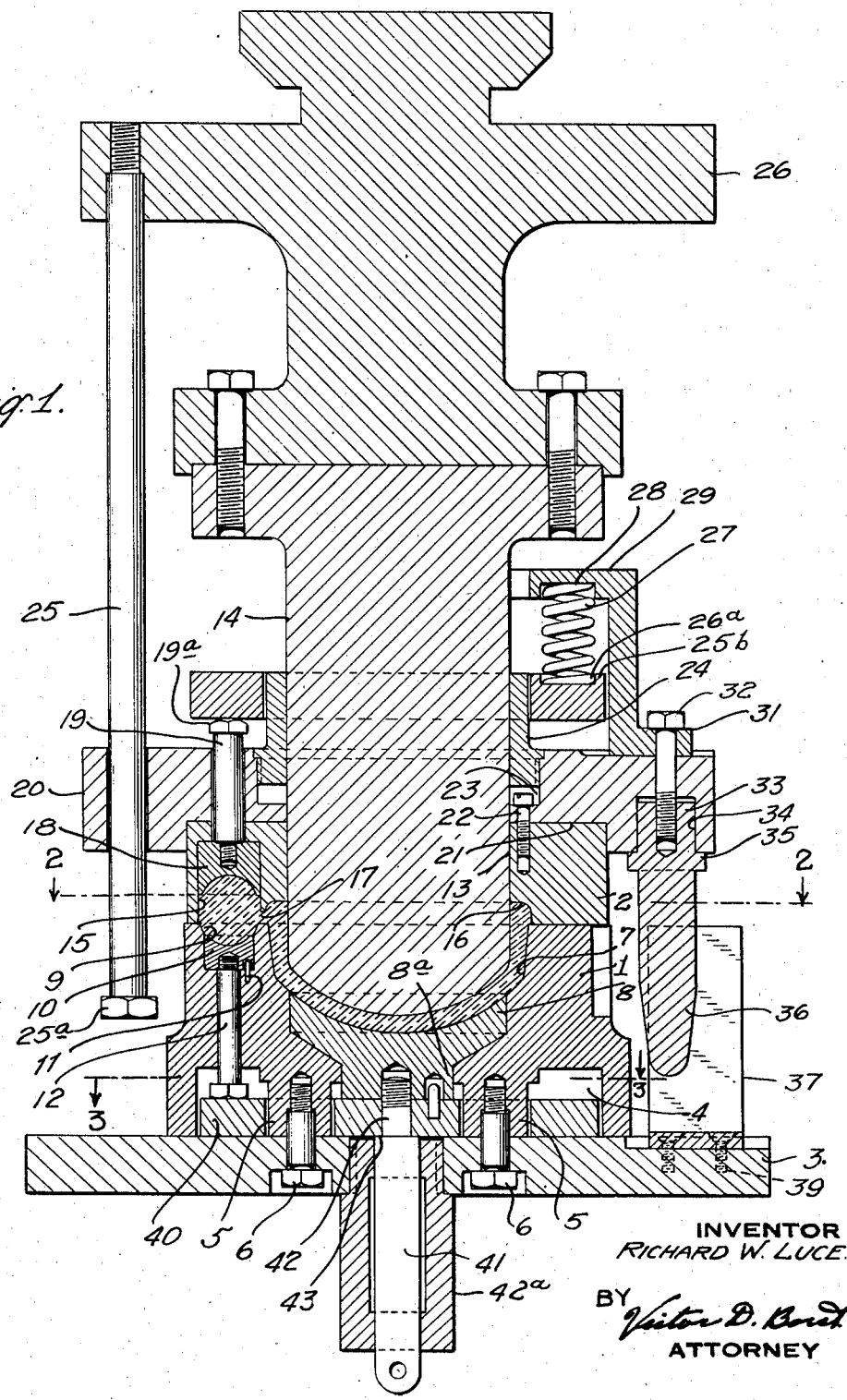
Fig. 1 is a sectional elevation of a mold and the plunger of a glass press or molding machine which cooperates with the mold.
Figure 2:
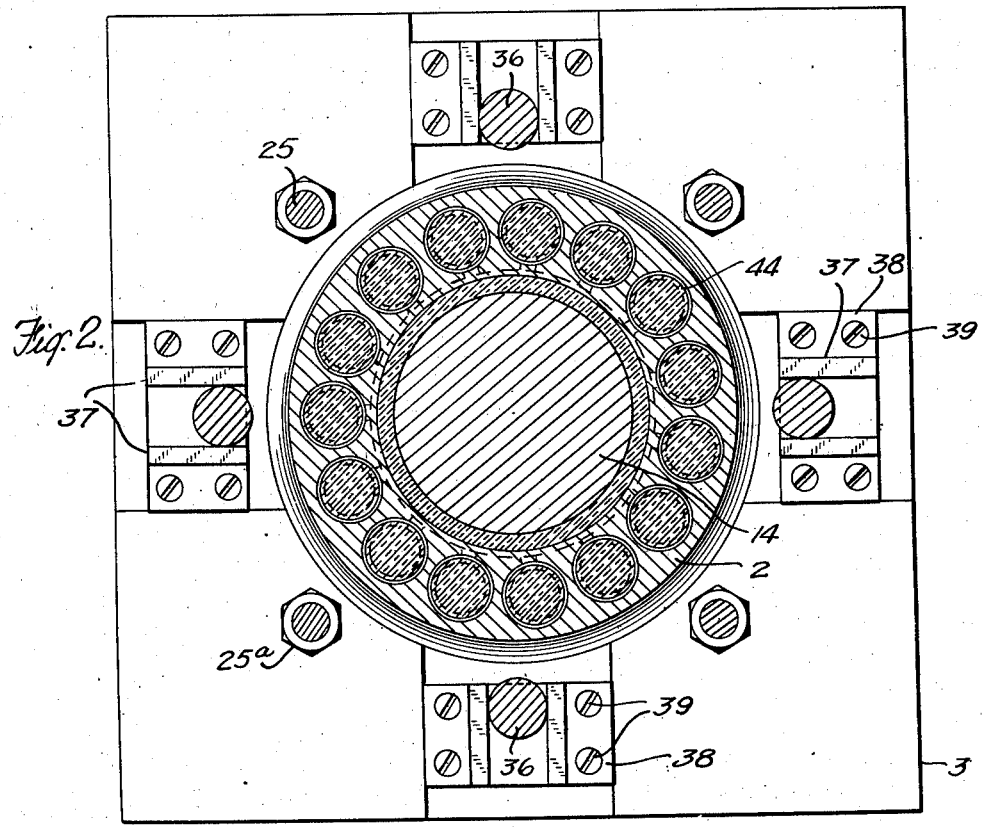
Fig. 2 is a transverse section taken on the line 2—2 of Fig. 1.
Figure 3:
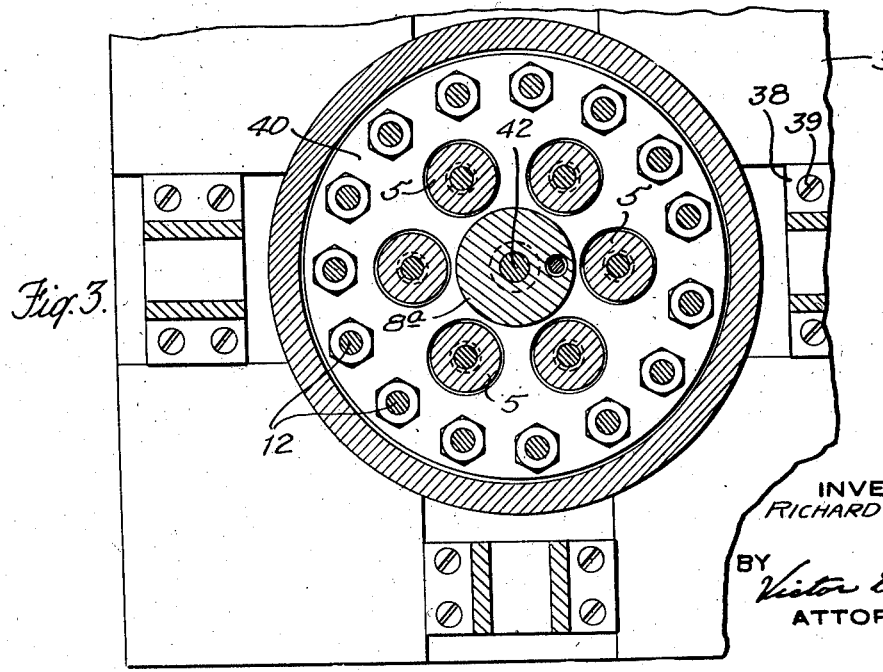
Fig. 3 is a transverse section taken on the line 3—3 of Fig. 1.

The mold illustrated in the drawings includes two separable members, a base 1 and a cooperating member or cap 2. In operation, the base 1 is mounted on a base plate 3 and when so assembled it is mounted on a glass molding machine or press. The end of the base in contact with the base plate 3 of the mold has formed therein a recess 4, and a series of posts or abutments 5, six in number, are formed on the base within the recess and abut against the base plate 3 of the machine. The base of the mold is secured to the base plate of the mold by bolts 6 that extend through the base plate 3 and are threaded into the posts 5. The base plate 3 is secured to the frame of the glass molding machine in such a way that a limited amount of sliding may take place between the base plate 3 and the frame of the machine.

The other end of the base of the mold is recessed at the center thereof to form a well 7, shaped as shown in the drawings. The base or end wall of this recess is formed by an insert 8 having an extension 8ª that is slidably mounted in the base of the mold. Surrounding the well, there are formed in the base 1 a series of mold recesses 9 (fifteen in the mold shown), which have a shape complementary to the shape of one portion of the glass to be molded. A part of the wall of each of these recesses, the end wall in the mold shown, is formed by an insert 10 that is slidably mounted in the recess. The insert 10 is positioned with respect to the recess against rotational movement in the recess by a dowel-pin 11. Secured in each insert in the mold recesses there is a bolt 12 which is threaded into an opening in the insert. This bolt extends through an opening provided therefor in the base of the mold and into the recess 4, the head of the bolt being in the recess 4 and being larger than the bore through which the bolt extends. The head of the bolt thus forms a limit stop which limits the amount that the insert 10 can slide in the mold recess.

The cap 2 of the mold has a central opening 13 therethrough that is smaller in diameter than the diameter of the well in the base. This opening is for the purpose of receiving a plunger 14 which acts upon a gob of glass placed in the well 7. The opening 13 through the cap forms with the recess 7 in the base of the mold the well into which a gob of molten glass is placed in the operation of molding glass. Surrounding this opening 13 through the cap 2 there are a series of mold recesses 15 formed in the surface of the cap 2 that is opposed to the base 1. In the cap 2 there are in number fifteen mold recesses, one for each of the mold recesses 9 in the base 1. The mold recesses of the cap 2 and the base 1 are aligned, and together, in the closed position of the mold, form a complete mold recess.

The opening 13 through the cap 2 is undercut as at 16 for a purpose which will hereinafter appear. Slots 17 constitute gates extending from the mold recesses to the well 7 and through which gates the pliable glass is caused to pass into the mold recesses by pressure on the glass in the well. The end wall of each of the mold recesses in the cap 2 is formed by an insert 18 that is slidably mounted in the recess 15. To each of these inserts there is secured a bolt 19 which extends through an opening provided therefor in the cap 2 and through an aligned opening in a plate 20 above the cap 2 and to which the cap is secured. The heads 19a of these bolts are beyond the plate 20 and being larger than the bore through which the bolt extends constitute limiting stops to limit the amount of movement of the inserts 18 in a direction to contract the mold recesses.

The cap 2 is received in a recess 21 formed in the adjacent side of the plate 20 and it is secured in this recess by machine screws 22. In the opposite side of the plate 20 there is formed a recess 23 in which a collar 24 is secured. Elongated bolts 25, four in number, extend from the head 26 of the plunger and through openings provided therefor in the plate 20. The bolts are threaded into the plunger head and are slidable in the openings in the plate 20. The heads 25a of the bolts are larger than the openings in the plate 20 through which the bolts extend. When the plunger head 26 is raised, the heads 25ª of the bolts 25 engage the plate 20 and raise the plate 20 and the cap 2 of the mold.

Surrounding the collar 24 there is an annular ring 25b that has a series of depressions 26ª formed in the upper surface thereof and spaced about the ring. These depressions 26ª are provided for receiving the ends of springs 27. The opposite ends of the springs 27 are received in recesses 28 formed in brackets 29. The brackets 29 have flanges 31 that are secured to the plate 20 by means of bolts 32. Thus, the springs 27 act to urge the ring 25b in a direction towards the plate 20. The ring 25b rests upon the heads of the bolts 19 and thus the force of the spring is exerted upon these bolts and the springs urge the inserts 18 in a direction to contract the mold recesses 15.

The bolts 32 that secure the flange 31 on the plate 20 extend through the plate 20 and are threaded into dowel-pins 33. The ends of these dowel-pins, four in number, are received in recesses 34 formed in the plate 20 and have formed thereon a shoulder 35 which limits the amount the dowel extends into the recess. Each of the dowels has a tapered end portion 36 for guiding the dowels between brackets which are provided to cooperate with the dowels. These brackets include a pair of brackets for each dowel. The brackets merely consist of plates 37 that extend perpendicular to the base plate 3 and a flange 38 extending from the plate 37, formed integral therewith and secured by bolts 39 to the base plate 3. As previously stated, two such brackets are provided for each dowel-pin, the dowel-pin entering between the brackets and a pair of brackets forming a slot for the dowel-pin. Each pair of brackets is spaced 90° apart, and the dowel-pins are similarly spaced.

It is very important that perfect registry be had between the sections of the mold and the plunger. This is necessary because of the necessity of the plunger 14 entering the mold and to effect exact aligning of the mold recesses in the two halves of the mold. Four dowel-pins and dowel slots are provided for this purpose. Two of these dowel-pins and the corresponding slots cause registry of the plunger mechanism and mold in one vertical plane, and the other two cause registry in the other vertical plane. Thus perfect registry is obtained. It is not desirable to utilize dowel holes for registry with the dowel-pins because the variation in temperature of the parts will not permit accurate registry of dowel-pins with dowel holes. It is for this reason that the dowel slots, formed by the brackets as above described, are utilized.

Within the recess 4 in the base 1 of the mold, there is mounted an ejector plate 40 that is slidable in the recess 4. In the normal position of the inserts 10 in the mold recesses 9, that is, in the position in which the inserts 10 are at their innermost position, the heads of the bolts 12 rest upon the ejector plate 40. Likewise the extension 8ª on the insert 8 forming the base of the well 7 rests upon the ejector plate. The ejector plate and the insert 8 are secured together by a rod 41 which has a threaded end portion 42 that extends through the ejector plate 40 and is threaded into a recess in the extension 8ª of the insert 8. The threaded end portion of the rod 41 is smaller in diameter than the rod 41 and a shoulder 43 is thus formed on the rod which abuts against the edge of the plate 40, and the plate and insert 8 are thus firmly secured together. The rod 41 slides in a bearing 42ª that is received in an opening in the base plate 3 of the mold.

In performing glass molding in accordance with this invention, the plunger 14 is raised by the glass press out of the well 7 by means of the plunger head 26 which is fast to the machine. When the plunger is thus raised, the plate 20 is also raised and the two parts of the mold are separated a substantial distance, sufficient so that a gob of plastic glass may be placed in the well 7. A gob of pot glass is then placed in the well 7 and the press operated to bring the plunger head 26 downwardly so that the plunger 14 extends into the well. As the plunger head moves downwardly, the cap 2 of the mold is brought into contact with the base 1 of the mold before the plunger 14 enters the well. Immediately the two parts of the mold come together, the plate 20 is gripped and firmly held against movement away from the base of the mold in a manner that is well known in the art of pressing glass. As the plunger head continues its downward path, the plunger 14 extends into the well and presses upon the gob of glass therein. The glass is thus caused to flow through the gates 17 and into the mold recesses. It will be noted that as the glass flows into the mold recesses, the inserts 18 in the mold recesses 15 are at their outermost position, that is, the position in which the mold recesses are contracted. As the glass enters the mold recesses and fills the recesses it causes the inserts 18 to recede, to move in a direction to expand the mold recesses.

Since the mold recesses are contracted at the time the glass enters the recesses, there is a minimum amount of air to be displaced from these mold recesses. Immediately the glass contacts with the surface of the inserts in the mold recesses, it chills, and a skin is formed of chilled glass. When the mold recesses are filled, the springs 27, acting through the ring 25ᵇ, urge the inserts 18 in a direction to contract the mold recesses. Pressure is thus exerted upon the glass in the mold recesses and this pressure is maintained during the shrinking of the glass. In the mold recesses illustrated, it will be noted that both ends of the recesses are arcuate in shape and between these there is a cylindrical portion. The arcuate end portions are stronger than the cylindrical portion and in consequence, with the pressure exerted on the end portions through the inserts, the shrinkage of the glass will cause a distortion of the cylindrical surface and not of the end surfaces.

The undercut recess 16 is formed in the well so as to avoid pressing against a solid column of glass that would otherwise occur if this recess were not formed. This recess provides space for the glass and avoids the necessity of pressing against a column of glass that is formed by chilling a small thickness of glass.

When the glass has cooled so that the shrinkage has taken place, the head 26 of the glass press or molding machine is raised. The plunger 14 is thus withdrawn from the well 7 and the plate 20 and cap 2 of the mold are raised. During the raising of the plate 20 and cap 2 of the mold, the springs 27 continue to exert a force urging the inserts 18 in a direction to contract the mold recesses. This force, at this time, acts to eject or strip the molded glass from the mold recesses 15. The molten glass thus remains in the lower half of the mold.

After the plunger and upper part of the mold has been raised, a force is applied to the rod 41 in a manner that is commonly utilized in glass molding presses and well known in the art. This force acts through the positive arrangement on the plate 40 and the inserts 10 are moved by the positive connection with the plate 20 to eject the glass from the mold recesses 9. Similarly, the glass is ejected from the well 7 by the movement of the insert 8 with the ejector plate.

Figure 4:
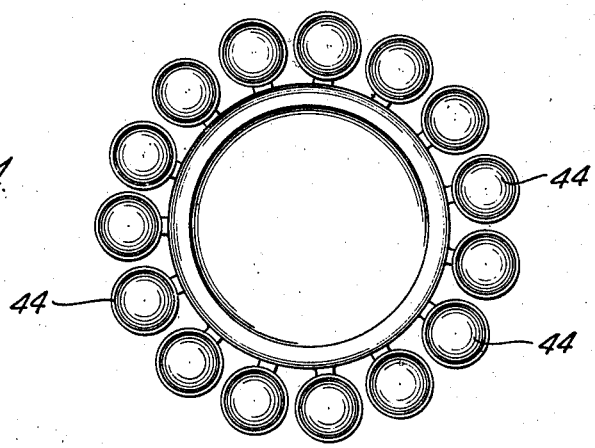
Fig. 4 is a plan of the glass as it is taken from the mold.
Figure 5:
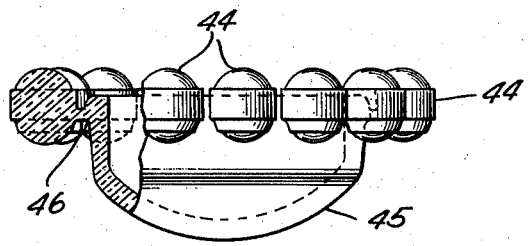
Fig. 5 is an elevation of the same, partly in section.

The glass molded by the mold illustrated in the drawings is shown in Figs. 4 and 5. This mold is for molding a series of lenses 44. These are double convexed lenses that are suitable for reflector buttons utilized in roadside signs. As the glass comes from the mold, it includes a dish-shaped portion 45, representing the shape of the well 7, and fifteen lenses 44 secured to this dish-shaped portion 45 by the glass 46 that was contained in the gates through which the mold recesses were fed from the well. By merely jarring the dish-shaped portion 45 the lenses 44 are readily broken at the gates. The only grinding operation necessary to complete the lenses for use is to grind off the portion of the glass at 46 that remains on the lenses when the lenses are broken from the part 45. This is a rough grinding operation as this portion of the lens does not affect the optical properties of the lens.

Figure 6:
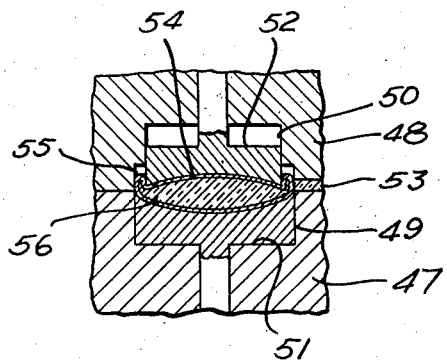
Fig. 6 is a modified form of mold for molding the lenses.

For forming thin lenses, the type of mold utilized is that shown in Fig. 6. When the glass enters the mold recess for a thin lens, there is immediately formed a skin at the edge of the lens. This prevents the exertion of pressure upon the lens faces or optical surfaces unless some means is provided to eliminate this factor from the consideration. This is the purpose of the mold disclosed in Fig. 6. The mold of Fig. 6 is likewise a separable mold containing a base 47 and a cap 48. The mold recess 49 in the base 47 is larger in diameter than the mold recess 50 in the cap 48. In the mold recess 49 there is an insert 51 and in the mold cap 48 there is a slidably mounted insert 52. The mold recess is fed through a gate 53. It will be noted that the insert 52 is smaller in diameter than the mold surface in the base 47. As the glass is forced into the mold recess, there is immediately formed, as the glass comes in contact with the surface of the mold recess, a skin indicated by the dotted line 54. On the circumference of the glass, this skin forms a wall that has considerable strength in compression and an insert could only be moved against this wall of glass by a force sufficient to destroy the integral character of the glass. Even with such a force, the insert could hardly be moved sufficiently to maintain the pressure on the surface of the glass in the recess until the shrinkage had occurred. However, with the insert of smaller diameter, the skin is bent just beyond the peripheral wall of chilled glass. The skin thus bends readily and pressure can therefore be maintained on the optical or lens surfaces of the glass during the shrinkage of the glass.

The thin lenses so formed may be utilized as they come from the mold providing the holder is designed to receive them. If the holder is not so designed, the outer portion or wall 55 of the lens 56 may be ground away.

From the foregoing it will be seen that there is provided a method and mold for molding glass and like substances by means of which satisfactory optical surfaces may be obtained by molding from pot glass. This eliminates the expensive grinding operations that had heretofore been necessary, particularly in making double convexed lenses.

It will be obvious that various changes may be made by those skilled in the art in the steps of the method above described and in the details of the embodiment of the mold shown in the drawings and described above within the principle and scope of the invention as expressed in the appended claims.

I claim:

1. In a mold for molding glass and the like, the combination comprising two separable mold parts having an aligned opening and recess forming a well adapted to receive a gob of glass in the pliable state and a plunger for expressing the glass, and each mold part having a mold recess therein at one side of the well and aligned with the mold recess in the other mold part and a gate connecting the mold recesses and the well, an insert slidably mounted in the recess of one mold part and forming the end wall thereof, means resiliently urging the insert in a direction to contract the mold recess, stop means carried by the insert for limiting the extent of contracting movement of the insert, and means associated with the plunger arranged to move the insert-containing mold part from its cooperating mold part as the plunger is withdrawn and thereby cause the insert to slide under the influence of the resilient means until restrained by the stop means and thereby eject the molded article from the insert-containing mold part.

2. In a mold for molding glass and the like, the combination comprising two annular separable mold parts having a circumferential series of registering mold cavities and inwardly opening gates therefor, a central concave insert in one of the mold parts forming a well communicating with said gates, an insert slidably mounted in each cavity of the other of said mold parts, a headed bolt attached to each insert and extending axially through said other mold part and adapted to transmit external thrust to the insert and to limit the movement thereof, a slidable plate in contact with the outer ends of the bolts, spring means between the said other mold part and said plate urging the inserts in a direction to contact the mold cavities, a plunger axially slidable within the mold parts to express molten glass from the well into the cavities, and means carried by the plunger and engaging the said other mold part and operative to move the same from its cooperative mold part as the plunger is withdrawn and thereby cause the inserts to be moved by the plate under the influence of the spring means until stopped by the heads of said bolts and eject the molded article from the cavities of said other mold part.

RICHARD W. LUCE.